Figure 1:
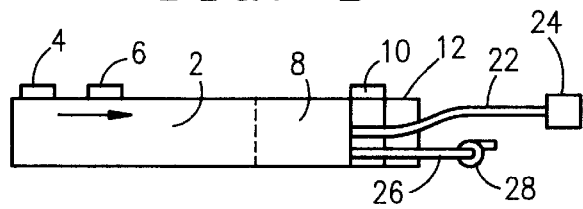

United States Patent [19]
Waldstrøm et al.

[11] Patent Number: 6,156,366
[45] Date of Patent: Dec. 5, 2000

[54] METHOD AND APPARATUS WITH A RELEASE THAWING STATION FOR PRODUCING FROZEN CONFECTIONERY BODIES

[75] Inventors: Ejvind Waldstrøm, Risskov; Ole Garne Krener, Højbjerg, both of Denmark

[73] Assignee: Tetra Pak Hoyer A/S, Hojbjerg, Denmark

[21] Appl. No.: 09/147,444

[22] PCT Filed: Jun. 30, 1997

[86] PCT No.: PCT/DK97/00286

§ 371 Date: Jan. 20, 1999

§ 102(e) Date: Jan. 20, 1999

[87] PCT Pub. No.: WO98/00031

PCT Pub. Date: Jan. 8, 1998

[30] Foreign Application Priority Data

Jun. 28, 1996 [DK] Denmark .................................. 0708/96

[51] Int. Cl.[7] .................................. A23G 9/00; F25C 5/08

[52] U.S. Cl. ............................... 426/515; 62/349; 426/524

[58] Field of Search .................................... 426/515, 511, 426/524; 62/349, 350, 352; 425/451

[56] References Cited

U.S. PATENT DOCUMENTS

| | | | |
|---|---|---|---|
| 821,957 | 5/1906 | Nicewarner | 62/349 |
| 4,715,193 | 12/1987 | Curti | 426/515 |
| 5,343,710 | 9/1994 | Cathenaut | 426/515 |

*Primary Examiner*—George C. Yeung
*Attorney, Agent, or Firm*—Nixon Peabody LLP; David S. Safran

[57] ABSTRACT

In the production of edible ice bodies moulded and frozen in moulds it is required to convey heat to the outsides of the moulds in order to enable a demoulding of the bodies upon release thawing thereof, this traditionally being effected through warm water. With the invention it has been realized that for both the production and the quality of the ice bodies there are important advantages connected with the use of hot steam for the release thawing.

9 Claims, 2 Drawing Sheets

METHOD AND APPARATUS WITH A RELEASE THAWING STATION FOR PRODUCING FROZEN CONFECTIONERY BODIES

The present invention concerns a method for making frozen confectionery products, especially edible ice bodies, which are frozen while they are in supporting contact with a support surface like a mould or a support plate which is subjected to a short-period heating by a heating medium for liberating the frozen product. Generally, when using common freezing technique the products will freeze on to the surfaces they are in contact with. In some productions the frozen products may be detached by mechanical scraping, but it is more common that they are loosened by heating the contact surface, which is particularly relevant with decidedly moulded products. Normally the contact surfaces will be good heat transmitters because they are used actively in the freezing process, and therefore they are also relative-ly easy to heat up for achieving a sufficient melting loose of the product surface frozen on to the contact surface.

In production apparatus for moulded edible ice bodies it is common to place the freezing moulds in rows and projecting downward from upper support lamellar plates which in chain formation are conveyed over a freezing bath with the freezing moulds projecting downward into the bath. As the lamellar plates reach the outlet end of the bath they are lifted up from it for a subsequent lowering into a bath with warm water, where they subsequent to an additional short forward run are ready to liberate the products.

By the present invention it is found possible to indicate a method by which the melting loose may be performed in an even more advantageous way, i.e. both faster and more uniformly. For an effective melting loose it is required that all part areas of surfaces frozen solid are melted, and there may very well appear differences in the degree of freeze in such a way that for one or more part areas it is necessary with more heat for melting than in other part areas; in this way, the run through the warm water bath or in a loading zone for warm air has to be sufficiently prolonged in order that also the more heat demanding areas will get to thaw and this implies both a relatively long run and an unnecessary extensive melting of the surface areas that are thawed loose in the first place.

By the invention is has been observed that by using hot steam as thawing medium surprisingly good results with respect to uniformity, speed, and energy consumption have been achieved. At the outset there is used an annular nozzle which is utilized with a fast upward and downward movement for sending jets of hot steam (100–150°) directly against the outer wall of a cold ice lolly mould, whereby the ice lolly may be freely drawn up after a period in the magnitude of 1 second. We are speaking of an extremely effective heat transmission produced by a instantaneous phase shift from gas to ice/liquid phase at the contact of the hot steam with the cold mould wall parts maybe having a temperature from $-20°$ to $-30°$, whereby a high local vacuum is created, carrying with it new steam with high speed, i.e. with the speed of sound. Thereby the warming up of the moulds becomes self-increasing.

An important fact is that hereby self-equalizing of the warming up will take place, since colder areas will automatically attract more steam than less cold areas. Furthermore, such a heat accumulation in the outer layer of the mould will take place so quickly that during a last stage of the thawing the heat will be distributed inwardly in a way almost controlled by demand, possibly after termination of the heat supply. With certain moulds it is hereby possible to work with an active warming up period of about 0.1 second, with an effective demoulding a few tenths of a second thereafter.

Even though the heat transmission in the moulds is not completely uniform with the said short thawing period there will no time for any further melting of the parts of the surfaces of the product situated at the areas with the highest heat transmission ability, and the length of the thawing zone, which conventionally cf. the example hereinabove is 12 lamellar widths, may be reduced to a single lamellar width, a fact which shortens the overall length of the apparatus or increases its capacity.

The heat energy used for the thawing is minimized because it is only the moulds that are heated, which also has the consequence that the subsequent renewed cooling only requires recooling of the moulds and not of the other moved parts. Thereby about 10–15% cooling power may be saved. The heat supply may easily be stopped and minimized by regulating the steam pressure.

Since the hot steam is sterile the method will hygienically advantageous, and besides that the system may be applied for sterilization of the moulds and the lamellas in that by slowing the rate of work of the apparatus when running idle it is possible to utilize the steam for heating these parts to 100°.

Normally the ice factories in question will already have a steam installation and therefore the invention will mean low investment and operating costs.

In ice making machines using cold air for freezing the products the invention may be realized in a simple and advantageous way in that the said annular nozzle may be utilized directly in the freezing compartment, since the energy supplied for thawing loose will be concentrated on the moulds in such a way that the direct heat exchange with the freezing air will be minimal. Thereby no separation of the compartment between the freezing and the thawing sections will be necessary, and the occurring energy waste will be rather small.

It is important to note that the use of the said annular nozzle indicates a functional ideal which in an acceptable way may be given free in practice. So if working in a usual way with transversely positioned rows of moulds in a conveying system it is a favourable opportunity just to use two mutually oppositely situated nozzle beams which then may service a whole row of moulds at a time. Preferably there is utilized a box-shaped body which uppermost has nozzle outlets or its inside and which at the bottom has a connection for a suction source.

Figure 2:
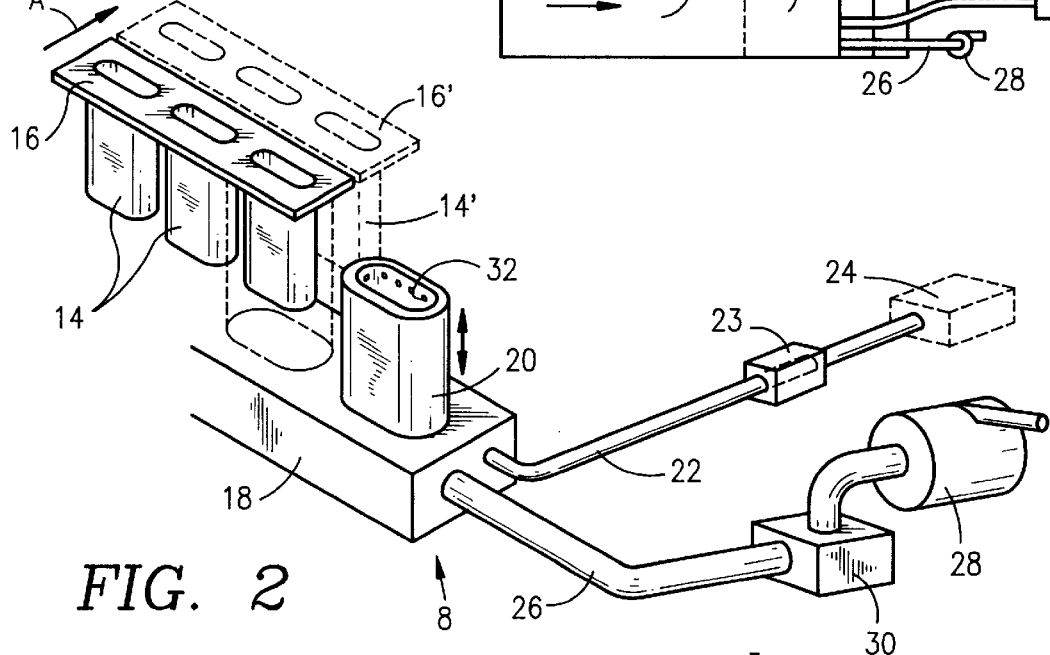
Figure 3:
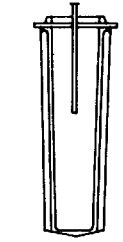
Figure 3:
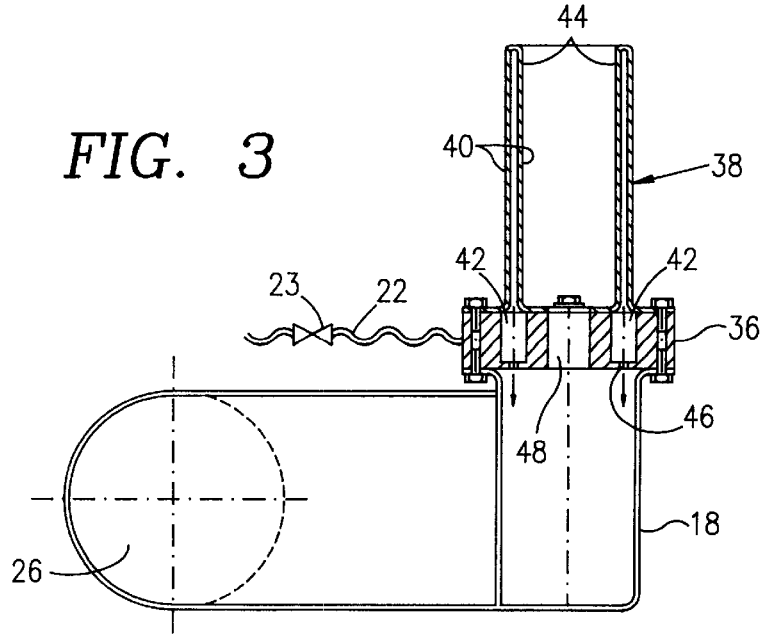
Figure 4:
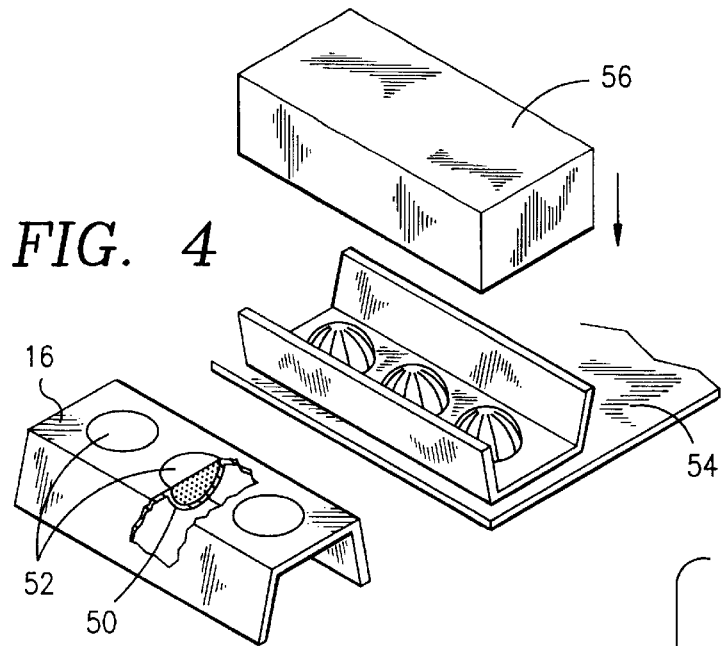
Figure 6:
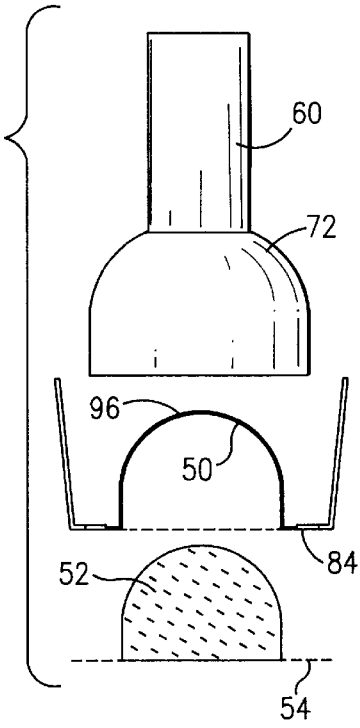
Figure 5:
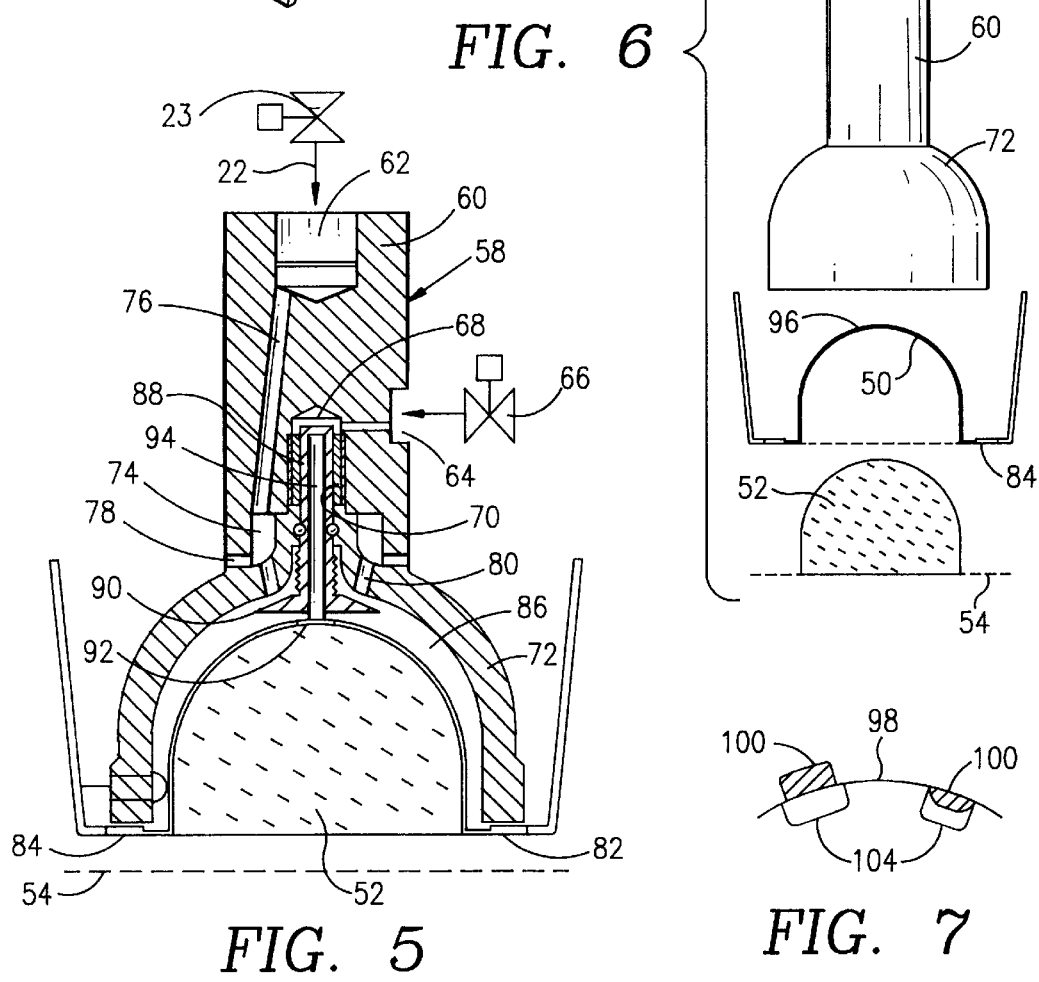
Figure 7:
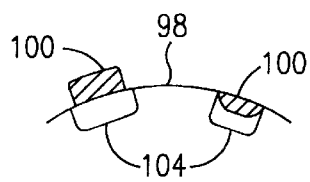

The invention will be explained in the following with reference to the drawing, on which FIG. 1 is a schematic overview of an ice production plant, FIG. 2 is a perspective view of some freezing moulds therein with a schematically shown thawing unit according to the invention, FIG. 3 is a more detailed sectional view of a such unit in a slightly modified form, FIG. 4 is a schematic perspective view corresponding to FIG. 2, but of a changed embodiment of the freeze moulds and the means for thawing loose, FIGS. 5 and 6 are sectional views for illustrating the working area of the thawing means, and FIG. 7 is a schematic sectional view showing further embodiments.

The plant shown on FIG. 1 comprises an apparatus housing 2, in which in a not shown way there is conveyed a belt with downwardly projecting freezing moulds which are filled with relevant confectionery or ice mass in a filling station, whereafter the moulds when passing a freezing zone are cooled for an initial freezing of their contents, so that in an action station 6 carrying or handling sticks or pins may be placed in the semifrozen bodies in the moulds. These are then subjected to further cooling in the freezing zone, and when the moulded bodies are frozen to a desirable degree they come to a thawing station 8, wherein the moulds are warmed up sufficiently for freely drawing up the moulded bodies from the moulds, which action may take place in the same or in a subsequent station 10. Thereafter the moulds are returned to the filling station, which is symbolically marked as return station 12, which, however, may also represent a mould cleaning station.

In the present connection the thawing station 8 is in focus and it is really without significance how the plant is designed besides that. The said support belt may extend around in the horizontal or vertical plane, and the mould freezing may take place using cold air or more conventionally by the use of freeze brine.

In FIG. 2 it is implied, that the shown freezing moulds 14 may be placed as rows on transversely positioned support lamellar plates 16 conveyed in a beltwise manner in the direction shown with arrow A. In regular production facilities there is used a large number of freezing moulds, so that it is possible to work with a production capacity of typically 20–40.000 units per hour.

Cf. FIG. 2 the lamellar plate $16^1$ shown with punctuated lines with corresponding freezing moulds $14^1$ has reached a position in the thawing station 8 in which according to the invention there is placed an underlying transverse beam 18 carrying a number of upright standing cylindrical bodies 20 with such a shape and position that these bodies can be slided upwardly for confining the respective freezing moulds $14^1$ by raising the transverse beam 18 or possibly by a corresponding lowering of the lamellar plate $16^1$.

The transversal beam is connected to a supply pipe 22 for hot steam from a steam source 24 together with a drain pipe 26 leading to an exhaust fan 28 via a steam trap 30. The cylindrical bodies 20 are shown as double walled cup bodies with an upper annular row of nozzle holes 32 in the inner wall. These holes are in a not shown way connected to the steam source 22 via a valve 23, and in the bottom of the cup bodies there is a connection to the suction pipe 26.

The transversal beam 18 may in this way be raised for achieving that the cup bodies 20 are slided upwardly for accomodating the moulds $14^1$, and if or when the valve 23 is opened hereby the said steam heating of the moulds will take place during the raising of the ring of nozzle holes 32 which will send jets of hot steam, e.g. at a pressure of 3 bar, directly against the mould walls. This treatment may continue or be repeated during the subsequent lowering of the transverse beam, but depending on the raising/lowering speed of the transversal beam it may be sufficient to keep the valve 23 open only during either raising or lowering. The suction from the pipe 26 counteracts pressure accumulation in the process compartment as well as it sucks up occurring condensate.

Immediately hereafter the ice bodies are drawn up from the moulds $14^1$ by lifting the mounted sticks, whether these are permanent handle sticks or special carrying pins that are pulled out in a subsequent station from the ice bodies for automatic returning to the insertion station 6.

As implied in the above by using transversely placed rows of moulds—i.e. just as the case is in FIG. 2—it is possible to abstain from utilizing the individual cup bodies 20, in that instead an upwardly open box structure may be used which in a corresponding way act on the moulds only from the respective opposite longitudinal sides, and such a unit is shown in section in FIG. 3. On the hollow transversal beam 18 there is mounted a top section 36 and a box body 38 projecting upward therefrom, the longitudinal sides of which body 38 are made up of double walls 40 connected at the bottom to longitudinally extending ducts 42 in the top section 36, while they at the top have inwardly facing nozzle holes or slits 44. The ducts 42 are connected with the steam supply 22, and at the bottom they have some minor holes or slits 46 for draining condensate from the inner compartments in the double walls. The bottom of the box body 38 is communicating with the hollow compartment in the beam 18 through a slot 48 and thereby also with the suction pipe 26.

In this embodiment there will not appear any steam jets directly against the narrow sides of the moulds $14^1$, but as mentioned before the cold surfaces in question will even suck the steam supplied to the spaces between the moulds to themselves, whereby the efficiency becomes very good anyway.

In the embodiment shown on FIG. 4 the tranversely positioned support plates 16, cf. FIG. 2, are made with indentations 50 for forming moulds for spheric ice bodies 52 without inserted sticks. When the plates 16 reach the thawing station they are turned 180° and are placed on a support plate 54 above which there is placed a thawing unit 56 to be lowered over the moulds 50 now facing upwards. Furthermore, in this station there is provided not shown means for lifting the plates 16.

Inside the unit 56 there is provided a device 58 as shown more closely in FIG. 5 for each of the moulds 50. This device has a top section 60 with connections 62 and 64 for the steam pipe 22 and for pressurized air from a controlled air valve 66, respectively. The top section 60 has a lower boring 68 accomodating an upward projecting neck piece 70 on a lower shell section 72 that is shaped approximately corresponding to the outside of the mould 50, but just slightly larger than this. Around the lower part of the neck piece 70 in the top section 60 there is shaped a recess 74 which through a drilling 76 is communicating with the steam supply 62. The shell body 72, 70 is made with an annular abutment 78 for sealingly abutting against the lower outer edge of the top section 60, i.e. it will be able to receive otherwise shaped shell bodies if only these are designed in a standardized way at the top. The recess 74 will then be closed downwards by means of an upper part of the shell piece 72, and exactly in this some holes 80 for downward steam jets from the recess 74 are drilled.

At its lower annular edge the shell part 72 has a downward facing sealing ring 82 which by lowering the whole device may provide a sealing abutment against the presently upward facing underside of the mould plate 16 outside around the mould 50. Between the mould edge and the sealing area in question there is provided some holes or slits 84 in the plate 16 for permitting evasion of air and steam from the compartment designated 86 between the shell part 72 and the mould 50 when steam is blown down through the holes 80.

The neck piece 70 is provided with a central boring in which there is accomodated a hollow pin 88 with a lower main section 90 provided with a downward facing sealing ring 92 around a central passageway 94 in the pin 88. The ring 92 is intended for abutting against the upper central area of the upwardly bulging mould 50 which just at this point has a small hole 96, so small that in the normal position of the mould it will not allow an outflow of the viscous freeze mass initially filled into the moulds 50. The hollow pin 88 may be slided upwardly against the action of a spring force.

When the unit 54, FIG. 4, has been lowered against the overturned mould plate 16 the situation appears as shown in FIG. 5. When the steam valve 23 is opened pressurized steam will be led to the compartment 86 through drilling 76, recess 74, and the holes 80 so that hot steam will sweep down along the external side of the mould 50, while air and excessive steam will evade through perforations 84 in the plate 16. While this plate may be a very thin metal sheet of e.g. stainless steel, and the mould sections 50 may be made of such a material and separately fastened to the support plate 16, the operation of thawing loose itself may hereby be performed extremely quickly so that it may be sufficient to supply steam during 1/10 of a second.

For performing a secure, active removal of moulds pressurized air may be supplied through connection 64—or possibly even pressurized steam—to the boring 68, whereby this pressure medium will act on the hollow pin 88 with a downward force, causing a efficient sealing at the ring 92, and will be conveyed through the passageway 94 and the hole 96 in the mould 50, so that the free-thawed ice body 52 will be acted on with a push downward of the mould 50. Such a pushing may take place when the support plate 16 is lifted more or less from the plate 54, e.g. just as indicated in FIG. 5, where the plate 54 is shown punctuated with a short distance below the plate 16.

Moreover, the main parts in question should then be lifted free from each other in order to permit further transport of both demoulded ice bodies 52 and the left mould plates 16, and such a required detachment is shown in FIG. 6.

It is a qualified part aspect of the invention that in the bottom of a casting or freezing mould a hole 96 may occur which do not allow outflow of the filled mass, but which later allow injection of a pressurized medium for expelling the cast or frozen body from the mould. Possibly there may be utilized means for a temporary blocking of the hole so that also low viscous masses may be retained.

It should be mentioned that the device shown in FIG. 5 may very well be used in the reversed position, i.e. without overturning the moulds, if only supplementary means for picking up the ice bodies are used, e.g. carrying pins or sucking discs.

The invention relates to performing all kinds of tasks pertaining to free-thawing including also the thawing free of ice products which in a simple way appear as lumps on a conveyed support belt, for example after cutting off pieces from an extruded run of the material to be frozen. In a subsequent, further freezing these pieces may very well adhere to the support belt, and a quick free-thawing may be achieved by supplying hot steam to the underside of the belt on the relevant spot.

On FIG. 7 there is shown a slightly curved conveying track of a support belt 98, which also could be straight, with lumps 100 of ice mass laid thereon, and where the lumps 100 can occur situated either completely at the outer side of the belt or in outer indentations 102 therein. At the free-thawing station in question there is arranged a permanent or a movable screen 104 through which hot steam may be injected for achieving a very quick local warming up of the support surface for the ice bodies 100 and thereby an effective liberation of these.

What is claimed is:

1. An apparatus for making frozen confectionery bodies comprising a conveying device for freezing molds for moving the molds through a filling station and a freezing zone to a de-molding station, wherein thawing means for heating the molds to loosen the frozen bodies for removal thereof from the molds, said thawing means comprising means for supplying hot steam to the exterior of the molds and a mantle member surrounding at least one of the molds, a narrow space being formed between the at least one mold and the mantle member, said mantle member having nozzle means connected with a hot steam supply source for injecting hot steam into and along said narrow space towards an outlet area from which air and steam are released from said narrow space.

2. The apparatus according to claim 1, in which said mantle member is a substantially cylindrical structure having said nozzle means arranged in a cross plane thereof, and in which motion means are provided for effecting relative movement between the at least one mold and the mantle member in an axial direction of said mantle member.

3. The apparatus according to claim 2, in which said mantle member forms a pocket for receiving the at least one mold through an open end thereof, said pocket having inwardly directed nozzle means in a wall adjacent to said open end, and a closed pocket end opposite to said open end being operatively connected with a suction source, said pocket being deep enough to receive the full length of said at least one mold.

4. The apparatus according to claim 1, in which said mantle member forms a pocket cavity for receiving an entire mold, said pocket cavity having an apex, at which said nozzle means are arranged, the narrow space between the mantle member and a mold inserted into said pocket cavity being annular and extending along at least a substantial length between respective end portions of the mold and the pocket cavity.

5. A method for making frozen confectionery bodies by freeze molding in individual molds and subsequently externally applying steam to the molds for loosening and removing the frozen bodies from the molds, comprising the steps of:

arranging at least one of the molds inside a mantle member having inner surface portions located slightly spaced from outer surface portions of the mold so as to create a narrow space between the mold and the mantle member, and injecting hot steam into and along the narrow space towards an outlet therefrom, the steam expelling air from the narrow space so as to intensify the heating effect of the steam on the mold.

6. The method according to claim 5, wherein said narrow space forms an annular zone about the at least one mold, and comprising the step of axially displacing the mold relative to the mantle member in said annular zone so as to effect thawing by a relative sweeping of the steam along sides of the at least one mold.

7. The method according to claim 6, wherein the mantle member is a substantially cylindrical member forming a pocket with an open end for receiving the at least one mold, said pocket having inwardly directed steam inlet openings in a wall adjacent to said open end and a suction source connected to an opposite end, the method further comprising the steps of inserting a mold into said pocket and retracting it therefrom, actuating steam supply to said inlet openings during at least one of an insertion and retraction of the mold, and effecting suction through said opposite end of the mantle member at least whenever said steam supply is actuated.

8. The method according to claim 5, in which said mantle member forms a pocket cavity for receiving an entire mold, and wherein said steam injecting step is performed through an apex end of said cavity.

9. The method according to claim 5, in which the steam is injected as jets at a pressure of at least 2 bar and a correspondingly elevated temperature.

* * * * *